United States Patent Office.

CHARLES LOUIS FLEISCHMANN, OF WASHINGTON, DISTRICT OF COLUMBIA.

Letters Patent No. 89,748, dated May 4, 1869.

IMPROVED PROCESS FOR AGEING LIQUORS AND SPIRITS, AND FOR PRODUCING AROMATIC ETHERS.

The Schedule referred to in these Letters Patent and making part of the same.

*To all whom it may concern:*

Be it known that I, CHARLES LOUIS FLEISCHMANN, of the city of Washington, District of Columbia, have invented a new process of concentrating and oxidizing in porous substances alcoholic liquors containing fusel-oils, for the purpose of improving and aromatizing other alcoholic liquors with it.

The nature of my invention consists in impregnating porous substances with alcoholic liquors containing fusel-oil, in order to concentrate and expose them to the influence of atmospheric air, whereby they are rendered highly aromatic, for the purpose of improving and imparting to less aromatic liquors a higher degree of aroma.

To enable others skilled in the art to make and use my invention, I will describe the process.

I use vats, barrels, or similar vessels, which can be well closed, to protect the contents from the influence of the air, and to prevent evaporation, but at the same time these vessels must have openings sufficiently large to admit the air, and give it free circulation, when required. In a barrel, for instance, the spigot and bung-hole are sufficient for that purpose.

In the vessel or vessels I introduce porous substances, of a nature that will not affect the liquor, giving it neither taste nor color.

The best materials are ligneous substances of an open cellular tissue, as, for instance, light-colored, loose-grained wood, pithy stems, cotton, and other ligneous fibre, the cobs of Indian corn, and many other substances of a porous nature.

The wood, stems, cobs, &c., must be divided into small pieces, and placed very loosely in the vessel, so as to leave as many spaces as possible between the pieces of wood or cobs, in order that they may present the greatest amount of surface for the absorption of the alcohol, and to the subsequent action of the oxygen.

When shavings, thin boards, sticks, or split corn-cobs are used, they must be first placed in boiling water, to free them from their peculiar extractive matter, they then must be well washed in clear water, and thoroughly dried.

When the vessel or vessels are filled with properly-prepared porous substances, of one and the same kind, or mixed, the spigot-hole is closed, and the alcoholic liquor containing fusel-oil is introduced, and left in contact with the porous substances until it is completely saturated, when the remainder of the liquor is drawn off, the spigot-bung and the top bung are removed, and the air allowed to circulate freely in the spaces between the porous matter, whereby a portion of the proper alcohol is evaporated, but the heavier, more highly carbonized alcohols of the fusel-oil are left in the pores of the ligneous substances, and exposed to the action of the oxygen.

The oxygen changes the more carbonized alcohol into acids and compound ethers, which give that peculiar aroma proper to certain alcoholic liquors. For instance, amyle alcohol is changed into valerian acid, œnanthyle alcohol into œnanthic acid, &c., and these acids again form compound ethers of a highly aromatic nature, which give the valuable character to various alcoholic liquors.

The porous substances, thus saturated with aromatized alcohol, can be used for imparting to less aromatic liquors a higher degree of aroma, either by putting such aromatized porous substances in inferior liquor, or by simply filling the vessel with liquor, in which the porous substance has been aromatized, leaving the liquor in contact with it, till it has acquired the desired degree of aroma, when the aromatized liquor has to be drawn off.

The porous matter in the barrel may be exposed again to the influence of the air, in the manner as above described, and it may be repeatedly used, till the porous matter becomes completely covered with glutinous oily matter, which is to be removed by washing before it can be used again.

What I claim as my invention, and desire to secure by Letters Patent, is—

The process of impregnating porous substances with alcoholic liquors containing fusel-oil, and exposing it to the influence of oxygen to be aromatized and concentrated, for the purpose and in the manner above described.

CHS. LOUIS FLEISCHMANN.

Witnesses:
A. B. STOUGHTON,
EDMUND MASSON.